United States Patent
Ito et al.

(10) Patent No.: US 6,534,624 B2
(45) Date of Patent: Mar. 18, 2003

(54) PROCESS FOR PRODUCING ALKYD RESINS

(75) Inventors: Kei Ito, Hiratsuka (JP); Chicara Kawamura, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 10/108,890

(22) Filed: Mar. 29, 2002

(65) Prior Publication Data

US 2002/0137878 A1 Sep. 26, 2002

Related U.S. Application Data

(63) Continuation of application No. 09/937,618, filed as application No. PCT/JP01/01295 on Feb. 22, 2001, now abandoned.

(30) Foreign Application Priority Data

Feb. 23, 2000 (JP) .......................................... 2000-45968

(51) Int. Cl.[7] .......................... C08G 64/00; C08G 63/02
(52) U.S. Cl. ......................................... 528/271; 528/272
(58) Field of Search ................................. 528/271, 272

(56) References Cited

U.S. PATENT DOCUMENTS

| 3,951,886 A | 4/1976 | Miyake et al. |
| 5,252,615 A | 10/1993 | Rao et al. |
| 5,858,551 A | 1/1999 | Salsman |

FOREIGN PATENT DOCUMENTS

| CA | 2087914 | 7/1993 |
| EP | 1217023 | 6/2002 |
| GB | 1401065 | 7/1975 |
| JP | 11-228733 | 8/1999 |

OTHER PUBLICATIONS

CIPO—Canadian Patent Database—Claims—2087914.

*Primary Examiner*—Terressa M. Boykin
(74) *Attorney, Agent, or Firm*—Wenderoth, Lind & Ponack, L.L.P.

(57) ABSTRACT

A process is disclosed, which enables production of alkyd resins within a short time, by conducting depolymerization and esterification reactions of polyester resins whose main starting material is terephthalic acid and which have been recovered from waste materials and regenerated, in a mixture of a polyhydric alcoholic component comprising tetra- or higher alcohol, an oil and fat and/or a fatty acid, and a polybasic acid component.

20 Claims, No Drawings

PROCESS FOR PRODUCING ALKYD RESINS

This is a continuation of Ser. No. 09/937,618, filed Sep. 27, 2001, now abandoned, which is a 371 of PCT/JP01/01295, filed Feb. 22, 2001.

TECHNICAL FIELD

This invention relates to a process for producing alkyd resins using polyester resins which have been recovered from waste materials such as disused PET bottles and regenerated.

BACKGROUND ART

In the past, terephthalic acid was normally not used as the dibasic acid component which is one of starting materials for producing alkyd resins, or if used, only in minor amount, because terephthalic acid was more costly than phthalic acid or phthalic anhydride and also because it tended to render the produced resins turbid or cause occurrence of foreign matters. On the other hand, recently disposal of waste is becoming a serious issue and utilization of disused PET bottles by recycling is under study.

A production method of alkyd resins using polyester resins which have been recovered from waste materials such as disused PET bottles and regenerated is described in, for example, Hei 11 (1999)-228733A-JP. Said method comprises subjecting recovered polyester resin and an alkyd resin oligomer having a molecular weight not higher than 5,000 and containing hydroxyl groups to depolymerization and transesterification. However, this method is subject to a number of problems such that it requires advance synthesis of the alkyd resin oligomer and requires many hours for the depolymerization because the amount of the alcohol component in the occasion of depolymerization is too low to sufficiently depolymerize the recovered polyester resin.

The object of the present invention is to provide a method of producing alkyd resins within a short time, using the polyester resins which have been recovered from waste materials and regenerated.

DISCLOSURES OF THE INVENTION

We have engaged in concentrative studies with the view to accomplish the above object and now discovered that the object could be fulfilled by conducing depolymerization of said regenerated polyester resin and esterification thereof in a mixture of an alcoholic component containing tetra- or higher hydric alcohol(s), an oil and fat and/or a fatty acid, and a polybasic acid component, and completed the present invention.

Accordingly, therefore, the invention provides a production method of an alkyd resin having an oil length of 30–70%, characterized by depolymerizing a polyester resin whose chief starting material is terephthalic acid which has been recovered from waste materials and regenerated, and concurrently esterifying the depolymerized product, in a mixture of an alcoholic component, an oil and fat and/or a fatty acid, and a polybasic acid component, in said alcoholic component the weight ratio of tri- or lower polyhydric alcohol(s) to tetra- or higher polyhydric alcohols being between 0 and 20, said polyester resin being used in an amount of 5–40% by weight, based on the sum of the polyester resin, the alcoholic component, the oil and fat and/or the fatty acid, and the polybasic acid component.

According to the invention, furthermore, paint compositions containing the alkyd resins which are produced by the above method are provided.

Hereinafter the method of the invention is explained in further details.

EMBODIMENTS OF THE INVENTION

Those polyester resins made chiefly from terephthalic acid, which have been recovered from waste materials and regenerated, and which are used in the process of this invention (hereafter the polyester resins may be abbreviated as "regenerated PES") include polyethylene terephthalate (e.g., PET bottles) which are recovered for recycling of resources, industrial waste polyethylene terephthalate, and polyester resins regenerated from the wastes occurring in the course of production of polyester products (film, fibers, automobile parts, electric and electronic parts, etc.) such as polyethylene terephthalate or polybutylene terephthalate made chiefly from terephthalic acid. In particular, recycled polyethylene terephthalate is suitable. The regenerated PES is normally used in the form of chips or pulverized pieces.

The method of the invention comprises depolymerization and esterification of such regenerated PES in a mixture of an alcoholic component containing tetra- or higher polyhydric alcohol(s) and optionally tri- or lower polyhydric alcohol(s); an oil and fat and/or a fatty acid; and a polybasic acid component, whereby obtaining an alkyd resin. The term, "esterification reaction", as used herein includes ordinary esterification reactions and transesterification reactions.

Examples of tetra or higher polyhydric alcohols constituting the above alcoholic component include diglycerine, triglycerine, pentaerythritol, dipentaerythritol and sorbitol. Of those, pentaerythritol is particularly suitable because of favorable curing and drying property of the painted film of the paint compositions in which the resulting alkyd resin is used. Also examples of tri- or lower polyhydric alcohols include: trihydric alcohols such as trimethylolpropane, trimethylolethane and glycerine; and dihydric alcohols such as ethylene glycol, diethylene glycol, triethylene glycol, propylene glycol, 1,3-propanediol, 1,4-butanediol, 1,5-pentanediol, neopentyl glycol, 1,6-hexanediol and 1,4-dimethylolcyclohexane. Of those, glycerine, ethylene glycol, diethylene glycol, triethylene glycol and propylene glycol are particularly suitable, from the standpoints of depolymerization ability as used in mixtures with said tetra- or higher polyhydric alcohols (e.g., pentaerythritol) and low-temperature dissolving ability of high temperature-melting tetra- or higher polyhydric alcohols.

In the alcoholic component, the blend ratio of tri- or lower polyhydric alcohols to tetra- or higher polyhydric alcohols should be within a range of 0–20, preferably 0.02–10, inter alia, 0.05–5 by weight.

Examples of the oil and fat, i.e., triglycerides of fatty acids, and/or the fatty acids to be mixed with above alcoholic component include the following: as oils and fats, soybean oil, safflower oil, linseed oil, tall oil, coconut oil, palm kernel oil, castor oil, dehydrated castor oil, fish oil and tung oil can be named. In particular, drying or semi-drying oils having iodine values of at least 100 are preferred, inter alia, soybean oil and tall oil are advantageous. As fatty acids, those of soybean oil, safflower oil, linseed oil, tall oil, coconut oil, palm kernel oil, castor oil, dehydrated castor oil, fish oil and tung oil may be named. Of those fatty acids, those of drying oils or semi-drying oils having iodine values of at least 100, inter alia, those of soybean oil and tall oil, are preferred.

The total amount of the selected oil and fat, and/or the fatty acid in the mixture is such that the oil length of the resulting alkyd resin should range 30–70%, preferably 40-60%, for imparting adequate drying property and physical performance of the dry painted films of paint compositions in which the alkyd resin is blended.

As the polybasic acid component to be concurrently used with above alcoholic component, the oil and fat and/or the fatty acid, those normally used as the acid component for forming alkyd resins can be similarly used. For example, dibasic acids such as phthalic anhydride, isophthalic acid, terephthalic acid, tetrahydrophthalic anhydride, hexahydrophthalic anhydride, naphthalenedicarboxylic acid, 4,4'-biphenyldicarboxylic acid, diphenylmethane-4,4'-dicarboxylic acid, succinic acid, fumaric acid, adipic acid, sebacic acid and maleic anhydride; tri- and higher polybasic acids such as trimellitic anhydride, pyromellitic anhydride, trimesic acid and methylcyclohexene-tricarboxylic acid; and $C_1$–$C_6$ (in particular, $C_1$–$C_4$) alkyl esters of those dibasic acids and tri- and higher polybasic acids can be named. Of those, dibasic acids and their $C_1$–$C_6$ (in particular, $C_1$–$C_4$) alkyl esters are preferred.

The use amount of such polybasic acid component is such that the equivalent number of the carboxyl groups in the polybasic acid component per hydroxyl equivalent of the alcoholic component should be within a range of 0.5–1, in particular, 0.6–0.99, inter alia, 0.7–0.99, for securing favorable water resistance and physical properties of the dry painted films. Here the term, "carboxyl groups of the polybasic acid component" is used to signify the value as converted to the carboxyl groups formed upon hydrolysing the esters, where the polybasic acid component is an ester of a polybasic acid.

The blend ratios of the alcoholic component, the oil and fat and/or the fatty acid, and the polybasic acid component in the mixture are not critical. Generally suitable ratios are, as the alcoholic component/the oil and fat and/or the fatty acid/the polybasic acid component, 100/50–700/50–200 by weight, in particular, 100/75–600/75–150, by weight.

In the method of the present invention, depolymerization of regenerated PES progresses in the absence of catalyst, at temperatures not lower than the melting point of PES (at least 240° C. for regenerated PET). For conducting the depolymerization at temperatures lower than said point, or with higher efficiency, it is generally preferable to use a depolymerization catalyst.

Examples of depolymerization catalyst used in said occasions include monobutyltin hydroxide, dibutyltin oxide, monobutyltin-2-ethyl hexanoate, dibutyltin dilaurate, stannous oxide, tin acetate, zinc acetate, manganese acetate, cobalt acetate, calcium acetate, lead acetate, litharge, antimony trioxide, tetrabutyl titanate and tetraisopropyl titanate. The use rate of the depolymerization catalyst is, per 100 weight parts of the total sum of the regenerated PES, alcoholic component, the oil and fat and/or the fatty acid, and the polybasic acid component, normally conveniently within a range of 0.005–10 parts, in particular, 0.01–5 parts, by weight. These depolymerization catalysts can normally serve also as catalysts for the esterification reaction.

According to the invention, a mixture of above-described alcoholic component, the oil and fat and/or the fatty acid, and the polybasic acid component is used, and by depolymerizing regenerated PES and concurrently conducting esterification reaction thereof in said mixture, an alkyd resin is formed. The alkyd resin-forming conditions in that occasion are not critical, so long as the depolymerization and esterification reaction of regenerated PES can progress either simultaneously or sequentially. For example, an alkyd resin can be prepared by adding regenerated PES and optionally a depolymerization catalyst to said mixture, and keeping them at temperatures of from about 180° C. to about 270° C., preferably from about 200° to about 260° C., for about 3 to 10 hours to carry out the depolymerization and esterification reactions.

In that occasion, it is adequate to use the regenerated PES in such an amount that the oil length of the formed alkyd resin ranges 30–70%, preferably 40–60%, for obtaining favorable drying ability and physical properties of dry paint film formed by applying paint compositions containing said alkyd resin. For accomplishing this, generally suitable use ratio of regenerated PES is 5–40%, in particular, 10–35%, inter alia, 10–30%, by weight, based on the total weight of the regenerated PES, the alcoholic component, the oil and fat and/or the fatty acid, and the polybasic acid component.

In the occasion of so producing alkyd resins, coloring of the formed alkyd resins can be inhibited by adding to the reaction system in advance, for example, 0.1–10 parts by weight, per 100 parts by combined weight of said mixture and regenerated PES, of a phosphorus compound and carrying out the esterification reaction. Examples of useful phosphorus compounds include: phosphoric acid, phosphorous acid and hydrophosphorous acid; and alkyl esters or phenyl esters of these acids (e.g., trimethyl phosphite, trimethyl phosphate, triphenyl phosphite and triphenyl phosphate).

After termination of the depolymerization and esterification reactions, the resulting alkyd resins are normally cooled. While they may be withdrawn as they are, they may also be diluted with an organic solvent before the withdrawal, to improve filterability and handling property. The kind of the organic solvent is not critical, so long as it can dissolve alkyd resins.

The alkyd resins which are obtained by the process of the invention excel in solubility in organic solvent and are soluble even in weak solvents such as mineral spirits, although they contain terephthalic acid component, and therefore are useful as resin binders in paint formulations. It is the recent tendency to attach much importance to overpaintability, and alkyd resins which are soluble in weak solvents are finding increasing use. The alkyd resins obtained by the process of the invention are adapted for this purpose.

An alkyd resin obtained by the process of the invention preferably has an oil length of 30–70%, in particular, 40–60%; a number-average molecular weight of 2,000–12,000, in particular, 2,500–10,000; a hydroxyl value of 10–150 mgKOH/g, in particular, 15–130 mgKOH/g; and an acid value of 1-50 mgKOH/g, in particular, 3–20 mgKOH/g.

Of the alkyd resins obtained by the process of the present invention, those in which drying oil fatty acids or semi-drying oil fatty acids are used as the fatty acid component excel in oxidation-drying property and are conveniently used as resins for normal temperature-curing type paints. Where they are used as resins for normal temperature-curing type paints, the drying property can be still improved by concurrent use of metal compound dryers such as cobalt naphthenate, zirocinium naphthenate, lead naphthenate and the like.

The alkyd resins obtained by the process of the present invention, in particular, those in which saturated fatty acids are used as the fatty acid component, can be conveniently used as resins for thermosetting paints, in combination with curing agents reactable with hydroxyl groups, such as amino resins like melamine resin, polyisocyanate compound, epoxy compound and the like. Paint compositions containing the alkyd resins obtained by the process of the present invention can be prepared by methods known per se, provided that an alkyd resin of the invention is used as at least a part of the resin binder.

EXAMPLES

Hereinafter the invention is more specifically explained with reference to Examples in which parts and percentages are by weight.

Example 1

A reactor equipped with a thermometer, stirrer, heater and a rectification column was charged with 119 parts of pentaerythritol, 30 parts of ethylene glycol, 347 parts of soybean oil fatty acid, 184 parts of soybean oil and 207 parts of phthalic anhydride, which were heated to 140° C. under stirring. Then 5.0 parts of litharge, 5.0 parts of zinc acetate and 150 parts of regenerated polyethylene terephthalate (regenerated PET) were added to the system and heated to 200° C. While removing water, the system was slowly heated to 240° C. over 2 hours and maintained at the same temperature for the subsequent 2 hours. At that time point 50 parts of xylene for refluxing was added, and the depolymerization and esterification reaction by dehydrative condensation were further conducted at 240° C. to provide an alkyd resin. Cooling the reaction product and diluting the same with 610 parts of mineral spirits, an alkyd resin solution containing about 60% of non-volatile component was obtained.

Examples 2–5

Alkyd resin solutions each containing about 60% of non-volatile component were obtained through identical operations with those of Example 1, except that the blend ratios of the ingredients were varied for each run as shown in later appearing Table 1.

Example 6

A reactor equipped with a thermometer, stirrer, heater and a rectification column was charged with 119 parts of pentaerythritol, 30 parts of ethylene glycol, 347 parts of soybean oil fatty acid, 184 parts of soybean oil and 207 parts of phthalic anhydride, which were heated to 140° C. under stirring. Into the mixture 150 parts of regenerated polyethylene terephthalate (regenerated PET) were added and together heated to 200° C. The temperature of the system was thereafter slowly raised to 255° C. over 2 hours while removing water, and maintained at the same level for subsequent 3 hours. Whereupon 50 parts of xylene for refluxing were added, followed by cooling to 240° C., and at which temperature the depolymerization and esterification reaction by dehydrative condensation were carried out to provide an alkyd resin. The product was cooled and diluted with 610 parts of mineral spirits to provide an alkyd resin solution containing about 60% of non-volatile component.

Example 7

Example 1 was repeated except that 2.0 parts of trimethyl phosphate were added, to provide an alkyd resin solution containing about 60% of non-volatile component.

Example 8

A reactor equipped with a thermometer, stirrer, heater and a rectification column was charged with 149 parts of pentaerythritol, 30 parts of ethylene glycol, 521 parts of soybean oil fatty acid and 210 parts of phthalic anhydride, which were heated to 140° C. under stirring. Into the mixture 5.0 parts of dibutyltin oxide, 5.0 parts of zinc acetate and 150 parts of regenerated polyethylene terephthalate (regenerated PET) were added and together heated to 200° C. The temperature of the system was then gradually raised to 240° C. over 2 hours, while removing water. After maintaining the system at said temperature for subsequent 2 hours, 50 parts of xylene for refluxing were added, followed by depolymerization and esterification reaction by dehydrative condensation at 240° C. to provide an alkyd resin. The product was cooled and diluted with 620 parts of mineral spirits to provide an alkyd resin solution containing about 60% of non-volatile component.

Example 9

A reactor equipped with a thermometer, stirrer, heater and a rectification column was charged with 89 parts of pentaerythritol, 30 parts of ethylene glycol, 540 parts of soybean oil and 237 parts of phthalic anhydride, which were heated to 140° C. under stirring. Into the mixture, 5.0 parts of litharge, 5.0 parts of zinc acetate and 150 parts of regenerated polyethylene terephthalate (regenerated PET) were added and together heated to 200° C. The temperature of the system was then gradually raised to 240° C. over 2 hours, while removing water. After maintaining the system at said temperature for subsequent 2 hours, 50 parts of xylene for refluxing were added, followed by depolymerization and esterification reaction by dehydrative condensation at 240° C. to provide an alkyd resin. The product was cooled and diluted with 610 parts of mineral spirits to provide an alkyd resin solution containing about 60% of non-volatile component.

Comparative Example 1

A reactor similar to the one used in Example 1 was charged with 119 parts of pentaerythritol, 78 parts of ethylene glycol, 347 parts of soybean oil fatty acid, 184 parts of soybean oil, 130 parts of terephthalic acid, and 207 parts of phthalic anhydride, which were heated to 140° C. under stirring. Then 5.0 parts of litharge and 5.0 parts of zinc acetate were added to the system and heated to 200° C. The temperature of the system was thereafter slowly raised to 240° C. over 2 hours and maintained at the same level for the subsequent 2 hours. At that time point 50 parts of xylene for refluxing was added, and dehydrative condensation was further conducted at 240° C. to provide an alkyd resin. Cooling the reaction product and diluting the same with 610 parts of mineral spirits, an alkyd resin solution containing about 60% of non-volatile component was obtained.

Comparative Example 2

Example 1 was repeated except that 136 parts of glycerine were used in place of 119 parts of pentaerythritol and 30 parts of ethylene glycol, and that the amount of phthalic anhydride was changed from 207 parts to 230 parts. Thus, an alkyd resin solution containing about 60% of non-volatile component was obtained.

Physical properties of the resins in those alkyd resin solutions which were obtained in above Examples 1-9 and Comparative Examples 1–2 were as shown in the following Table 1.

TABLE 1

| | No. | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| Starting materials | pentaerythritol | 119 | 119 | 126 | 119 | 119 | 119 | 119 | 149 | 89 | 119 | |
| | glycerine | | | | 46 | | | | | | | 136 |
| | ethylene glycol | 30 | 6 | 30 | | | 30 | 30 | 30 | 30 | 78 | |
| | diethylene glycol | | | | | 51 | | | | | | |
| | soybean oil fatty acid | 347 | 347 | 174 | 347 | 347 | 347 | 347 | 521 | | 347 | 347 |
| | soybean oil | 184 | 184 | 88 | 184 | 184 | 184 | 184 | | 540 | 184 | 184 |
| | phthalic anhydride | 207 | 148 | 200 | 207 | 207 | 207 | 207 | 210 | 237 | 207 | 230 |
| | terephthalic acid | | | | | | | | | | 129 | |
| | litharge | 5 | 5 | 5 | 5 | 5 | | 5 | | 5 | 5 | 5 |
| | dibutyltin oxide | | | | | | | | 5 | | | |
| | zinc acetate | 5 | 5 | 5 | 5 | 5 | | 5 | 5 | 5 | 5 | 5 |
| | regenerated PET | 150 | 225 | 150 | 150 | 150 | 150 | 150 | 150 | 150 | | 150 |
| | trimethyl phosphate | | | | | | | 2 | | | | |
| | refluxing xylene | 50 | 50 | 50 | 50 | 50 | 50 | 50 | 50 | 50 | 50 | 50 |
| | mineral spirits | 610 | 610 | 610 | 610 | 610 | 610 | 610 | 610 | 610 | 610 | 610 |
| Physical property of resin | number-average molecular weight | 4100 | 4000 | 3800 | 4000 | 3900 | 4100 | 3800 | 4000 | 4200 | 4200 | 3400 |
| | resin acid value (mgKOH/g) | 7.6 | 7.4 | 6.9 | 7.2 | 7.5 | 7.2 | 7.2 | 7.5 | 7.2 | 7.4 | 8.2 |
| | resin hydroxyl value (mgKOH/g) | 27 | 26 | 101 | 55 | 25 | 27 | 44 | 44 | 22 | 26 | 17 |
| | Gardner color number of resin solution | 7 | 7 | 7 | 7 | 7 | 7 | 2 | 7 | 7 | 7 | 7 |
| | Gardner viscosity of resin solution | YZ | Z | Z | Y | YZ | Z | XY | Y | Y | YZ | Z |
| | appearance of resin solution | good | good | good | good | good | good | good | good | good | turbidity occurred | good |

Test Examples 1–9 and Comparative Test Examples 1–2
Preparation of Paint Compositions and Test Panels With 196 parts each of the alkyd resin solutions containing 60% of non-volatile component as obtained in above Examples and Comparative Examples, 0.6 part of 5% cobalt naphthenate solution and 2.5 parts of 12% zirconium naphthenate solution were mixed to provide clear paints.

Each of the formed clear paints was applied onto a piece of tin plate to a dry film thickness of 100 μm. The painted plates were allowed to stand in a 20° C. and 60% RH room and the time required for the paint films to give dry touch and the cure-drying time were measured.

The hardness of the cure-dried paint films was also measured with König's pendulum hardness tester. The test results were as given in Table 2.

TABLE 2

| Test No. | Alkyd resin (Example No.) | Dry touch-attaining time (hrs.) | Cure-drying time (hrs.) | Paint film hardness (König's hardness tester) |
|---|---|---|---|---|
| Test Example 1 | Example 1 | 3 | 5 | 28 |
| Test Example 2 | Example 2 | 3 | 5 | 33 |
| Test Example 3 | Example 3 | 3 | 5 | 29 |
| Test Example 4 | Example 4 | 3 | 5 | 29 |
| Test Example 5 | Example 5 | 3 | 5 | 26 |
| Test Example 6 | Example 6 | 3 | 5 | 28 |
| Test Example 7 | Example 7 | 3 | 5 | 28 |
| Test Example 8 | Example 8 | 3 | 5 | 29 |
| Test Example 9 | Example 9 | 3 | 5 | 27 |
| Comparative Test Example 1 | Comparative Example 1 | 4 | 7 | 31 |
| Comparative Test Example 2 | Comparative Example 2 | 6 | 18 | 8 |

Industrial Utilizability

According to the process of the present invention, transparent alkyd resins can be prepared within a short time, using polyester resins recovered from waste materials and regenerated. The process of the invention, therefore, utilizes waste materials and enables recycled use of disused PET bottles and the like.

The alkyd resins which are obtained through the process of the invention can be conveniently used as resins for normal temperature-curing type paints, or those for thermosetting type paints, in combination with curing agents. Furthermore, the alkyd resins obtained by the process of the invention are transparent and free of turbidity, although they contain terephthalic acid component, and are soluble in weak solvent such as mineral spirits. The resins, therefore, can be conveniently used also as resins for paints which are required to exhibit over-paintability.

What is claimed is:

1. A process for producing an alkyd resin having an oil length of 30–70 %, characterized by depolymerizing polyester resin whose chief starting material is terephthalic acid and which has been recovered from waste materials and regenerated, and concurrently carrying out its esterification reaction, in a mixture of an alcoholic component in which the weight ratio of tri- or lower polyhydric alcohol to tetra- or higher polyhydric alcohol is within a range of 0–20, an oil and fat and/or a fatty acid, and a polybasic acid component, the polyester resin being used in an amount of 5–40% by weight, based on the total weight of the polyester resin, the alcoholic component, the oil and fat and/or the fatty acid, and the polybasic acid component.

2. A process according to claim 1, in which the polyester resin is recycled polyethylene terephthalate.

3. A process according to claim 1, in which the tetra- or higher polyhydric alcohol is selected from the group consisting of diglycerine, triglycerine, pentaerythritol dipentaerythritol and sorbitol.

4. A process according to claim 1, in which the tetra- or higher polyhydric alcohol is pentaerythritol.

5. A process according to claim 1, in which the tri- or lower polyhydric alcohol is selected from the group consisting of trimethylolpropane, trimethylolethane, glycerine, ethylene glycol, diethylene glycol, triethylene glycol, propylene glycol 1,3-propanediol, 1,4-butanediol, 1,5-pentanediol, neopentyl glycol, 1,6-hexanediol and 1,4-dimethylolcyclohexane.

6. A process according to claim 1, in which the tri- or lower polyhydric alcohol is glycerine, ethylene glycol, diethylene glycol, triethylene glycol or propylene glycol.

7. A process according to claim 1, in which the weight ratio of the tri- or lower polyhydric alcohol to the tetra- or higher polyhydric alcohol lies within a range of 0.02–10.

8. A process according to claim 1, in which the oil and fat is semi-drying oil or drying oil, and the fatty acid is semi-drying oil fatty acid or drying oil fatty acid.

9. A process according to claim 1, in which the polybasic acid component is a dibasic acid selected from the group consisting of phthalic anhydride, isophthalic acid, terephthalic acid, tetrahydrophthalic anhydride, hexahydrophthalic anhydride, naphthalenedicarboxylic acid, 4,4'-biphenyldicarboxylic acid, diphenylmethane-4,4'-dicarboxylic acid, succinic acid, fumaric acid, adipic acid, sebacic acid and maleic anhydride, or its $C_1$–$C_6$ alkyl ester.

10. A process according to claim 1, in which the polybasic acid component is used at such a ratio that the carboxyl equivalent number of the polybasic acid component is within a range of 0.5 to 1, per one hydroxyl equivalent in the alcoholic component.

11. A process according to claim 1, in which the polyester resin is used in an amount of 5–40% by weight, based on the total weight of the polyester resin, the alcoholic component, the oil and fat and/or the fatty acid, and the polybasic acid component.

12. A process according to claim 1, in which the polyester resin is used in an amount of 10–35% by weight, based on the total weight of the polyester resin, the alcoholic component, the oil and fat and/or the fatty acid, and the polybasic acid component.

13. A process according to claim 1, in which the depolymerization and esterification reactions are carried out by adding the polyester resin and if necessary a depolymerization catalyst to a mixture of the alcoholic component, the oil and fat and/or the fatty acid, and the polybasic acid component.

14. A process according to claim 13, in which the depolymerization catalyst is selected from the group consisting of monobutyltin hydroxide, dibutyltin oxide, monobutyltin-2-ethyl hexanoate, dibutyltin dilaurate, stannous oxide, tin acetate, zinc acetate, manganese acetate, cobalt acetate, calcium acetate, lead acetate, antimony trioxide, tetrabutyl titanate and tetraisopropyl titanate.

15. A process according to claim 13, in which the depolymerization catalyst is used in an amount ranging from 0.005 to 10 parts by weight per 100 parts by weight of the total sum of the polyester resin, the alcoholic component, the oil and fat and/or the fatty acid, and the polybasic acid component.

16. A process according to claim 13, in which the depolymerization and esterification reactions are carried out at a temperature between 180 and 270° C.

17. A process according to claim 13, in which a minor amount of a phosphorus compound is added to the reaction system.

18. A process according to claim 1, in which the alkyd resin has an oil length of 40-60%.

19. Alkyd resins which are prepared by a process as defined in any one of claims 1–18.

20. Paint compositions containing the alkyd resins which are prepared by a process as defined in any one of claims 1–18.

* * * * *